United States Patent
Yokomachi et al.

[11] Patent Number: 6,115,204
[45] Date of Patent: Sep. 5, 2000

[54] ROTARY HEAD TYPE MAGNETIC RECORDING/REPRODUCING APPARATUS EMPLOYING DYNAMIC CLOSED LOOP AND SEMI-CLOSED LOOP OR OPEN LOOP TRACKING SYSTEMS

[75] Inventors: Yoshiyuki Yokomachi, Tsu; Kazuki Murata, Fukuoka, both of Japan

[73] Assignee: Sharp Kabushiki Kaisha, Osaka-fu, Japan

[21] Appl. No.: 08/278,151

[22] Filed: Jul. 21, 1994

[30] Foreign Application Priority Data

Jul. 26, 1993 [JP] Japan ................................. 5-184196

[51] Int. Cl.[7] .................................................. G11B 5/588
[52] U.S. Cl. ......................................................... 360/77.16
[58] Field of Search .............................. 360/77.14, 77.16, 360/27, 77.13, 70, 77.12, 77.02, 77.04, 78.05, 69, 77.08, 78.02, 78.09, 10.2; 369/44.25, 44.34, 44.35, 44.28; 310/317

[56] References Cited

U.S. PATENT DOCUMENTS

| | | | |
|---|---|---|---|
| 4,194,226 | 3/1980 | Kaseta et al. | 360/77.02 X |
| 4,237,399 | 12/1980 | Sakamoto | 310/317 |
| 4,689,698 | 8/1987 | Ishikawa et al. | 360/69 |
| 4,775,903 | 10/1988 | Knowles | 360/77.04 X |
| 4,924,325 | 5/1990 | Yamashita | 360/10.2 |
| 5,311,380 | 5/1994 | Murata et al. | 360/77.12 |
| 5,355,486 | 10/1994 | Cornaby | 360/77.08 X |
| 5,379,165 | 1/1995 | Pahr | 360/78.02 |
| 5,404,252 | 4/1995 | Nagasawa et al. | 360/77.16 |
| 5,404,255 | 4/1995 | Kobayashi et al. | 360/78.09 |

FOREIGN PATENT DOCUMENTS

| | | |
|---|---|---|
| 60-25046 | 2/1985 | Japan . |
| 4-67454 | 3/1992 | Japan . |
| 4-67455 | 3/1992 | Japan . |

*Primary Examiner*—Paul Loomis
*Assistant Examiner*—James L. Habermehl

[57] ABSTRACT

A rotary head type magnetic recording/reproduction apparatus according to the present invention includes a recording format in which a plurality of pilot signals of different frequencies are recorded to be superimposed sequentially on a main signal for every other track. The magnetic recording/reproduction apparatus includes a single head structure where a plurality of magnetic heads are attached to a plurality of actuators in a one-to-one correspondence. For one magnetic head detecting a relative position error signal out of the plurality of magnetic heads, dynamic tracking under closed loop control is carried out. For another magnetic head that does not detect a relative position error signal, open loop control or semi-closed loop control is carried out according to information concerning the amount of displacement of the one magnetic head. Thus, a magnetic recording/reproduction apparatus is provided that allows highly accurate dynamic tracking without providing many pilot signal generation means and without reducing the manufacturing yield of a head drum.

47 Claims, 9 Drawing Sheets

ROTARY HEAD TYPE MAGNETIC RECORDING/REPRODUCING APPARATUS EMPLOYING DYNAMIC CLOSED LOOP AND SEMI-CLOSED LOOP OR OPEN LOOP TRACKING SYSTEMS

BACKGROUND OF THE INVENTION

1. Field of the Invention

The present invention relates to rotary head type magnetic recording/reproduction apparatuses such as helical scanning system video tape recorders (VTR), and more particularly, to a rotary head type magnetic recording/reproduction apparatus employing a dynamic tracking system in which a magnetic head is displayed in a track width direction by an actuator.

2. Description of the Background Art

In recent years, there have been efforts to significantly increase the density of recorded information in a magnetic recording/reproduction apparatus, resulting in reduction of the track width. Such reduction of the track width causes strict conditions on a magnetic head to carry out a satisfactory tracking operation. More specifically, when a signal is to be reproduced from a track having the width reduced in a conventional type of magnetic recording/reproduction apparatus having the magnetic head fixed to the rotary drum so that the magnetic head cannot move in the direction of the track width, deviation occurs in the tracking of the magnetic head, leading to a possibility that a sufficient reproduced output cannot be obtained from the magnetic head.

A magnetic recording/reproduction apparatus including a dynamic tracking system is proposed, such as in U.S. Pat. No. 4,237,399. Such a magnetic recording/reproduction apparatus uses a magnetic head that is displaceable in the direction of the track width by an actuator, in which the position of the magnetic head in the track width direction is controlled by a closed loop according to a signal reproduced from the magnetic head.

FIG. 1 is a block diagram schematically showing the main components of a dynamic tracking system of such a conventional magnetic recording/reproduction apparatus. The conventional dynamic tracking system of FIG. 1 includes a magnetic head 4, a reproducing circuit 5, a position error detection circuit 6, an adder 1, an actuator driving circuit 2, and an actuator 3.

In a reproduction operation, magnetic head 4 picks up a signal recorded on a magnetic tape (not shown), which is output as a signal x to the outside as well as to reproducing circuit 5. At the time of reproduction, reproducing circuit 5 generates a reproduced signal v according to output signal x of magnetic head 4. Position error detection circuit 6 detects an error signal e indicating the relative position error amount of magnetic head 4 with respect to a track on the magnetic tape according to output v of reproducing circuit 5. Error signal e is added with a reference driving signal a which is supplied from a controller (not shown) of the magnetic recording/reproduction apparatus and normally takes a value of zero in adder 1. The result of such addition is provided to actuator driving circuit 2 as a control signal b. Actuator driving circuit 2 is formed mainly of amplifiers (not shown) provided for loop gain adjustment or the like, and various filters provided for servo characteristic compensation or the like. According to control signal b, actuator driving circuit 2 generates a driving signal c which is provided to actuator 3. Actuator 3 responds to driving signal c to displace magnetic head 4 in the direction of the track width. A bimorph type piezo actuator using a piezoelectric element, or an electro magnetic type voice coil motor type actuator are generally used as actuator 3. The circuit configuration from actuator driving circuit 2 to adder 1 via actuator 3, magnetic head 4, reproducing circuit 5 and position error detection circuit 6 forms a closed loop control system.

Detection of error signal e by position error detection circuit 6 can be carried out in many ways. A typical one is a pilot signal method. According to this pilot signal method, the position error amount of a magnetic head and the polarity indicating the direction of deviation of the magnetic head from the track can be detected simultaneously by recording a pilot signal having a different frequency to be superimposed on a main signal for each track. This pilot signal method is also used in an automatic track finding (ATF) system employed in a 8 mm VTR. In the case of a 8 mm VTR, four types of pilot signals each having a frequency differing from each other are used.

FIG. 2 is a schematic diagram for describing the detection principle of a head position error amount at the time of reproduction by a position error detection circuit 6 when such 4 types of pilot signals are used (a 4-frequency pilot signal method). Referring to FIG. 2, a plurality of tracks 11 are formed on a magnetic tape 10. A magnetic head A traces these tracks. The width of magnetic head A is greater than 1 track pitch so that signals can also be reproduced partially from tracks adjacent to the currently traced track.

It is assumed that four types of pilot signals having different frequencies of $F_1$, $F_2$, $F_3$, and $F_4$ are recorded cyclically to be superimposed on a main signal in the plurality of tracks 11 respectively, as shown in FIG. 2. The pilot signal frequencies of $F_1$, $F_2$, $F_3$, and $F_4$ are defined as set forth in the following with the horizontal synchronizing frequency of a video signal being represented as $f_H$.

$f_1 = 6.5\ f_H$
$f_2 = 7.5\ f_H$
$f_3 = 10.5\ f_H$
$f_4 = 9.5\ f_H$

It is appreciated from the above definition of the pilot signal frequency and the arrangement shown in FIG. 2 that the difference in the pilot signal frequency between adjacent tracks is set so that $3f_H$ and $f_H$ are arranged in an alternate manner such as $3f_H$, $f_H$, $3f_H$, $f_H$, $3f_H$, . . . .

In an azimuth type magnetic recording/reproduction apparatus, adjacent tracks are formed by heads having azimuths differing from each other at the time of recording. Therefore, in a reproduction operation using a magnetic head A having a width greater than 1 track pitch as shown in FIG. 2, the partially reproduced output from a track adjacent to the track currently traced by magnetic head A is greatly reduced in level with respect to the main signal component in the high frequency band due to azimuth loss. However, since the azimuth loss is small with respect to pilot signal components having the frequency band set to a low range, a large crosstalk signal is obtained as the partially reproduced output from an adjacent track.

According to the state shown in FIG. 2, magnetic head A tracing a track on which a pilot signal of frequency $f_2$ is recorded reproduces the pilot signal components of frequencies $f_1$ and $f_3$ from the two adjacent tracks as crosstalk signals. By multiplying the crosstalk signals of frequencies $f_1$ and $f_3$ reproduced from the left and right adjacent tracks respectively by the pilot signal of frequency $f_2$ reproduced from the reference track, two pilot beat signals can be obtained as the crosstalk components from the left and right adjacent tracks. By taking the difference between these two crosstalk components, the amount of deviation from the track being traced by magnetic head A can be determined by the level of that difference, and the direction of deviation can be detected according to the polarity thereof. Thus, the difference between two crosstalk components (pilot beat signals) is calculated by position error detection circuit 6 to be output as an error signal e.

However, the 4-frequency pilot signal method shown in FIG. 2 requires four types of signal generation circuits in order to generate pilot signals having four different frequencies of $f_1$, $f_2$, $f_3$, and $f_4$. There was a problem that the circuit complexity is increased.

To solve this problem of the 4-frequency pilot signal system, an intermittent track recording method using two types of pilot signals having different frequencies is proposed. Such a method is disclosed in, for example, Japanese Patent Laying-Open No. 60-25046.

FIG. 3 shows a format of such an intermittent track recording method using two types of pilot signals. Referring to FIG. 3, two types of pilot signals having different frequencies of $f_1$ and $f_2$ are alternately recorded for every other track. By tracing each of the tracks in FIG. 3 using a magnetic head A having a width greater than 1 track pitch as described before, crosstalk signals of the pilot signal components of frequencies $f_1$ and $f_2$ will be obtained from both the adjacent left and right tracks only when a track having no pilot signal recorded is traced as shown in FIG. 3. In other words, position error information of a magnetic head can be obtained for only every other track by the reproducing system of a single head shown in FIG. 3.

A conventional magnetic recording/reproduction apparatus employing such an intermittent track recording method uses a pair of magnetic heads as shown in FIG. 4 to overcome this disadvantage. More specifically, a pair of actuators 21 and 22 are provided facing each other by 180° in the circumferential direction of a drum 20. A pair of magnetic heads A1 and A2 are disposed in close proximity to each other on one actuator 21, and a pair of magnetic heads B1 and B2 are disposed in close proximity to each other on the other actuator 22. The above-described problem is to be solved by tracking two adjacent tracks simultaneously by such pair of heads.

According to an azimuth recording system format, heads A1 and A2 of one pair are in opposite azimuth, and also heads B1 and B2 of the other pair are also in opposite azimuth. Therefore, these pairs of heads are called double azimuth heads.

FIG. 5 schematically shows the recording/reproduction principle using the double azimuth head of FIG. 4. In a recording operation, one pair of magnetic heads A1 and A2 forming a double azimuth head records main signals (each including a luminance signal and a chrominance signal) on one pair of adjacent tracks 11a and 11b. Simultaneously, a pilot signal of frequency $f_1$ is recorded to be superimposed on the main signal on one track 11a by one magnetic head A1. When tracing of the track by heads A1 and A2 ends, the other pair of magnetic heads B1 and B2 (not shown in FIG. 5) forming the other double azimuth head records main signals on the other pair of adjacent tracks 11c and 11d. Simultaneously, a pilot signal of frequency $f_2$ differing from frequency $f_1$ is recorded to be superimposed on the main signal on one track 11c by one magnetic head B1. By repeating such recording operations cyclically, two types of pilot signals having different frequencies of $f_1$ and $f_2$ are recorded alternately for every other track.

In a reproducing operation, always magnetic head A2 (or B2) of one pair of magnetic heads A1 and A2 (or B1 and B2) forming the double azimuth head reproduces crosstalk signals of the pilot signal components of frequencies $f_1$ and $f_2$ from the left and right tracks, as shown in FIG. 5. Here, because one magnetic head A2 (or B2) that reproduces a crosstalk signal is fixed in close proximity on the same actuator 21 (or 22) with the other magnetic head A1 (or B1) that does not reproduce a crosstalk signal as the double azimuth head, similar tracking can be carried out integrally for the other magnetic head A1 (or B1) by carrying out closed loop control based tracking of one magnetic head A2 (or B2) that reproduces a crosstalk signal. Therefore, the heads can be positioned at high accuracy as a whole.

FIG. 6 schematically shows the installed manner of a conventional double azimuth head with respect to the actuator. On one actuator 21, a pair of magnetic heads A1 and A2 are installed with a difference in the vertical direction (in the height direction) corresponding to 1 track pitch Tp between magnetic heads A1 and A2. Similarly, on the other actuator 22, the other pair of magnetic heads B1 and B2 are installed with a difference in the vertical direction therebetween corresponding to 1 track pitch Tp.

However, such a provision of a pair of magnetic heads on the same actuator with a difference of Tp therebetween as shown in FIG. 6 requires significantly high accuracy due to reduction of a track width, i.e., reduction of one track pitch Tp in accordance with increase of density of recorded information as described before. It is extremely difficult to satisfy such a requirement of high accuracy, resulting in reduction of the manufacturing yield of a head drum. This causes increase in the manufacturing cost of a magnetic recording/reproduction apparatus.

SUMMARY OF THE INVENTION

An object of the present invention is to provide a rotary head type magnetic recording/reproduction apparatus that can carry out dynamic tracking of high accuracy.

Another object of the present invention is to provide a rotary head type magnetic recording/reproduction apparatus that can carry out dynamic tracking of high accuracy with a simple circuit configuration, and without providing many pilot signal generation means, by employing a recording format in which pilot signals are recorded for every other track.

A further object of the present invention is to provide a rotary head type magnetic recording/reproduction apparatus having the manufacturing yield of a head drum improved by employing the so-called single head structure magnetic head even when a recording format is employed in which pilot signals are recorded for every other track.

A rotary head type magnetic recording/reproducing apparatus of the present invention having a function of reproducing a main signal from a plurality of tracks having a plurality of pilot signals of different frequencies recorded to be superimposed sequentially on the main signal for every other track includes: a rotary drum, a plurality of actuators, a plurality of magnetic heads, a position error detection circuit, a first actuator driving circuit, a microcomputer, and a second actuator driving circuit. The plurality of actuators are attached on a circumferential surface of the rotary drum with a constant distance therebetween. Each actuator is displaceable in the direction of the track width. The plurality of magnetic heads are attached to the plurality of actuators in a one-to-one correspondence. At the time of reproduction, the position error detection circuit detects a relative position error signal of one magnetic head out of the plurality of magnetic heads with respect to one track out of the plurality of tracks according to the pilot signal components included in a signal reproduced from the one track by the one magnetic head. The first actuator driving circuit generates a control signal for driving one actuator corresponding to the one magnetic head out of the plurality of actuators so that the value of the relative position error signal approaches 0 by closed loop control according to the detected relative position error signal. The microcomputer temporarily stores information concerning the amount of displacement of the one actuator. The second actuator driving circuit drives another actuator out of the plurality of actuators by open loop control or a semi-closed loop control according to the information stored in the microcomputer.

According to another aspect of the present invention, the microcomputer temporarily stores information concerning the control signal generated by the first actuator driving circuit as information concerning the displacement amount of the one actuator. The second actuator driving circuit drives another actuator out of the plurality of actuators by open loop control according to the stored information.

According to a further aspect of the present invention, an absolute height detection circuit for detecting the absolute height of each of the plurality of magnetic heads is provided. The microcomputer temporarily stores information concerning the absolute height of the magnetic head attached to the one actuator detected by the absolute height detection circuit as information concerning the displacement amount of the one actuator. The second actuator driving circuit drives another actuator out of the plurality of actuators by semi-closed loop control according to the stored information.

A main advantage of the present invention is to carry out dynamic tracking of high accuracy without providing a plurality of pilot signal generation means by using a recording format in which pilot signals are recorded for every other track, and carrying out dynamic tracking by closed loop control for one actuator of one magnetic head having a relative position error signal detected, and carrying out dynamic tracking by open loop control or semi-closed loop control for another actuator of another magnetic head having no relative position error signal detected according to information concerning the displacement amount of the one actuator of the one magnetic head.

Another advantage of the present invention is to allow employment of a single head structure in which one magnetic head is attached to one actuator, and improve the manufacturing yield of a head drum by carrying out dynamic tracking under closed loop control for one actuator of one magnetic head having a relative position error signal detected, and carrying out dynamic tracking by open loop control or semi-closed loop control for another actuator of another magnetic head having no relative position error signal detected according to information concerning the displacement amount of the actuator of the one magnetic head.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The head arrangement common to the dynamic tracking system of each embodiment of the present invention will be described first with reference to FIGS. 7 and 8.

Figure 7:
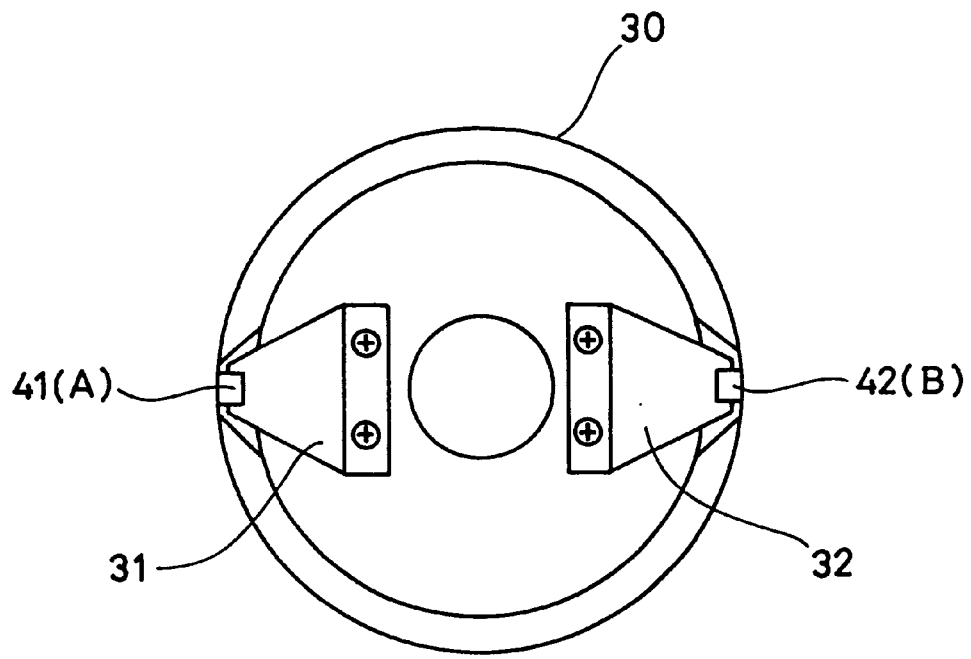
FIG. 7 is a bottom view of a rotary drum showing the head arrangement of a single head method according to embodiments of the present invention.

FIG. 7 is a bottom view of the upper drum of a single azimuth head system used in the dynamic tracking system of each embodiment of the present invention. FIG. 8 is a schematic sectional view of this upper drum 30. Referring to FIGS. 7 and 8, a pair of actuators 31 and 32 are provided at two locations facing each other by 180° in the circumferential direction of upper drum 30. A single magnetic head 41 (for the sake of convenience, may be indicated as magnetic head A) is attached on first actuator 31. A single magnetic head 42 (for the sake of convenience, may be indicated as magnetic head B) is attached on second actuator 32. First and second magnetic heads 41 and 42 are in opposite azimuth.

Figure 1:
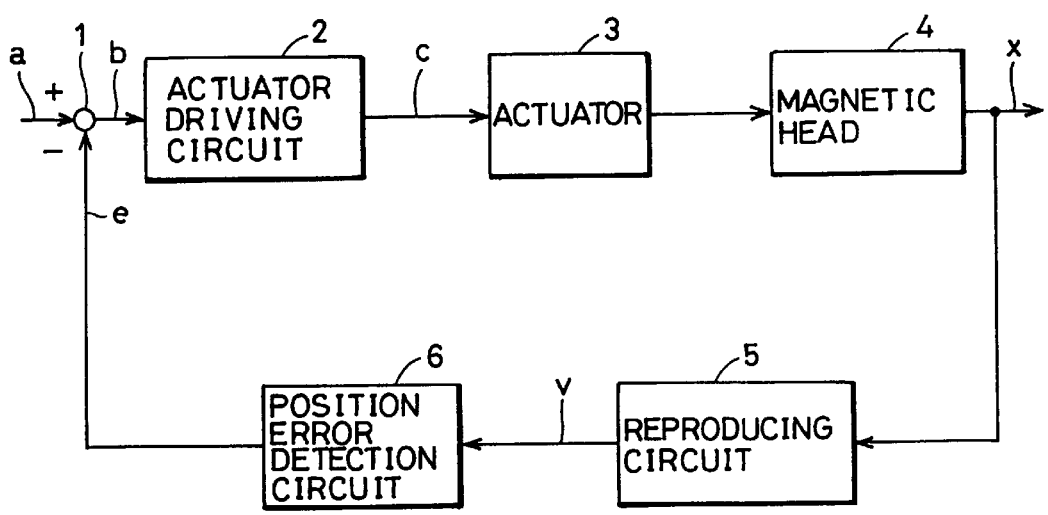
FIG. 1 is a schematic block diagram showing the main components of a dynamic tracking system of a conventional magnetic recording/reproduction apparatus.
Figure 2:
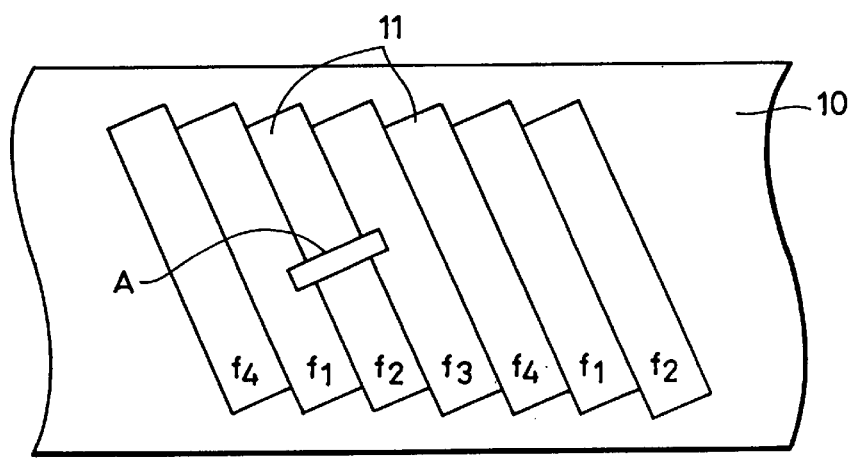
FIG. 2 is a schematic diagram for describing the detection principle of a head position error amount according to a conventional 4-frequency pilot signal method.
Figure 3:
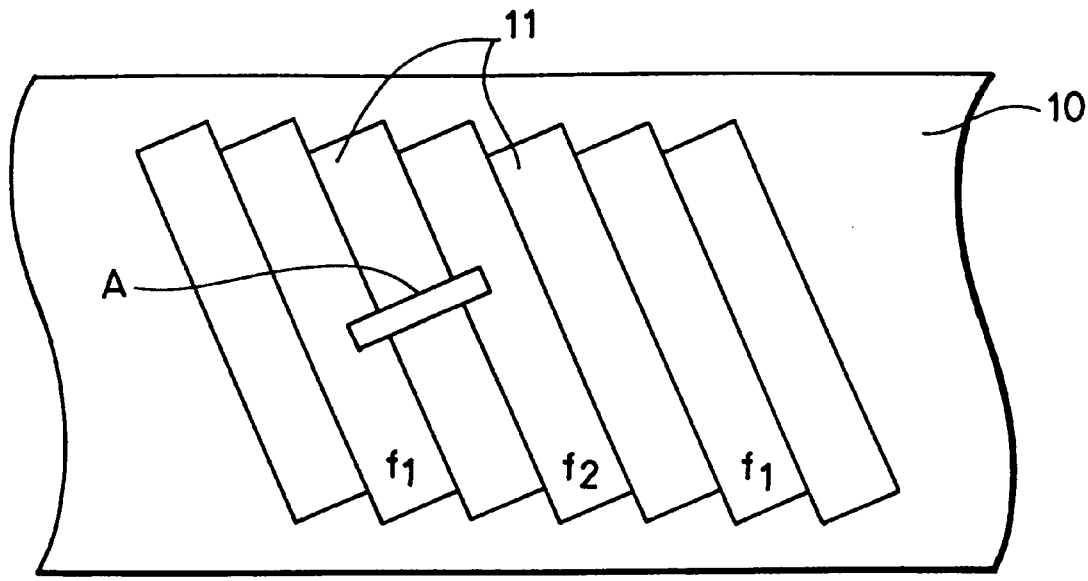
FIG. 3 is a schematic diagram for describing the detection principle of a head position error amount according to a conventional 2-frequency pilot signal method.
Figure 4:
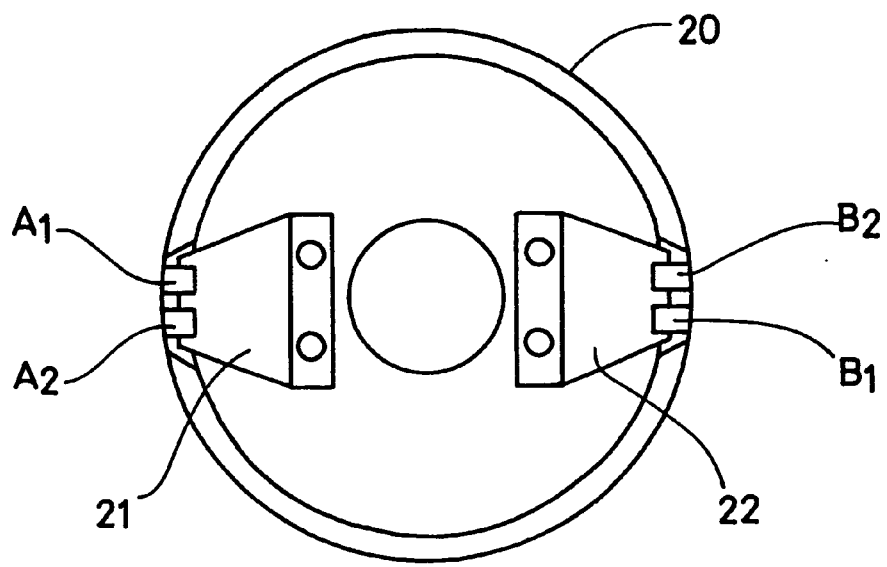
FIG. 4 is a bottom view of a rotary drum showing the head arrangement of a conventional double azimuth head.
Figure 5:
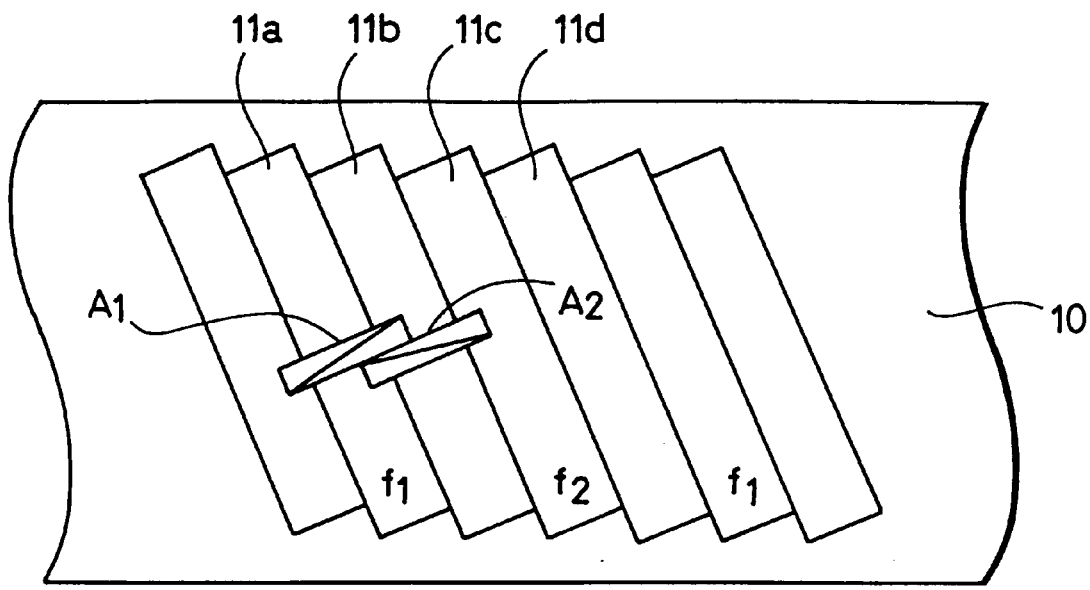
FIG. 5 is a schematic diagram for describing the recording/reproduction principle using the conventional double azimuth head of FIG. 4.
Figure 6:
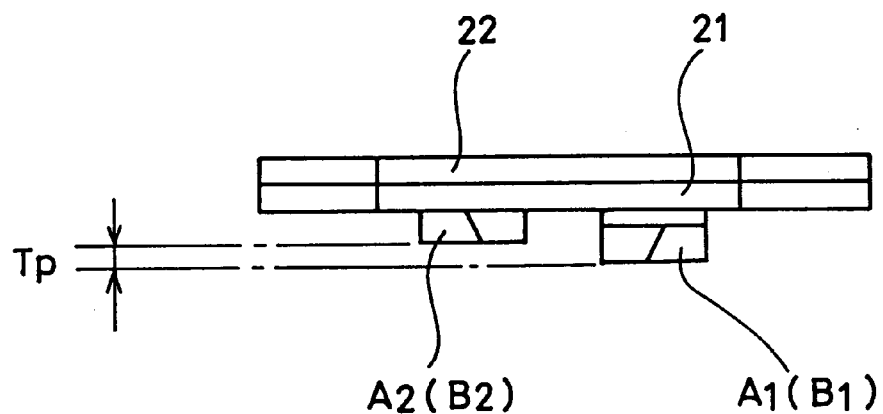
FIG. 6 is a diagram showing the installed manner of a conventional double azimuth head to an actuator.

In the single head system shown in FIG. 7, there is no need to provide a pair of magnetic heads forming the double azimuth head on the same actuator with an extremely small difference in height therebetween corresponding to 1 track pitch Tp and with significantly high accuracy as in the conventional case shown in FIG. 4. The attachment of first and second heads 41 and 42 to actuators 31 and 32, respectively, and the attachment of actuators 31 and 32 to drum 30 can be carried out as set forth in the following without requiring high accuracy.

The relative difference in the height direction between magnetic heads 41 and 42 can be adjusted by controlling the voltages applied to actuators 31 and 32 to which these magnetic heads are attached. The difference in the height direction between heads 41 and 42 can be measured after the heads are attached to the actuators, or after the actuators are attached to the drum. By adjusting the applied voltages to actuators 31 and 32 according to the measured value, the difference in the position of the heads in the height direction can be canceled afterwards.

Figure 8:
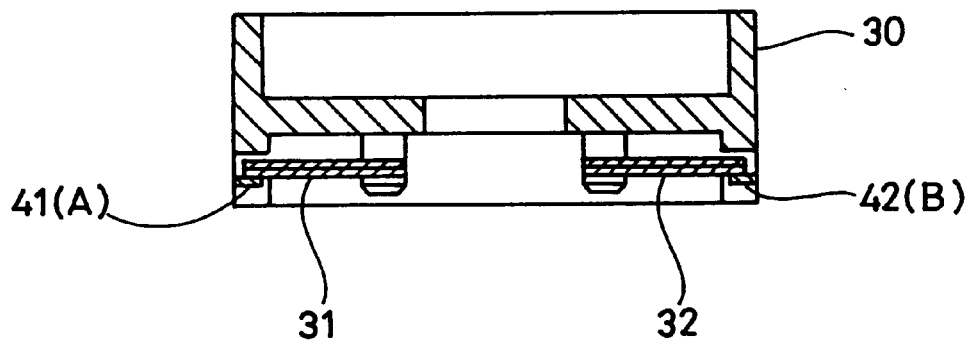
FIG. 8 is sectional view schematically showing the rotary drum of FIG. 7.

Although bimorph type piezo actuators using piezo electric element are used as actuators 31 and 32 in the embodiment shown in FIGS. 7 and 8, the present invention is not limited to this embodiment and an electromagnetic type voice coil motor type actuator and other types of actuators may be used. Also, magnetic heads 41 and 42 may be magnetic heads dedicated for reproduction, or may be magnetic heads commonly used for both recording and reproduction.

The basic principle of the present invention will be described hereinafter. In a rotary head type magnetic recording/reproduction apparatus such as a helical scanning type VTR, the formed track may be bent due to various factors such as an unevenness in the working accuracy of a lead for running a tape formed on the circumferential face of the rotary drum, variation in the running speed of a magnetic head, and displacement in the width direction during travel of a tape. This is generally called a track bent. This track bent does not occur randomly for each track, and is seen in each track with a constant tendency inherent to that magnetic recording/reproduction apparatus.

By having one magnetic head A from which a position error signal is detected trace accurately the track through a dynamic tracking system under closed loop control, and having the other magnetic head B from which a position error signal trace is not detected trace an adjacent track so as to directly reproduce the locus of the trace of the one magnetic head A, dynamic tracking of high accuracy can be carried out even if the other magnetic heads B is under open loop control or semi-closed loop control. The present invention is carried out according to this concept. Dynamic tracking is carried out by open loop control for magnetic head B in the first embodiment, and dynamic tracking by semi-closed loop control for magnetic head B is carried out in the second embodiment, which will be described hereinafter.

Figure 9:
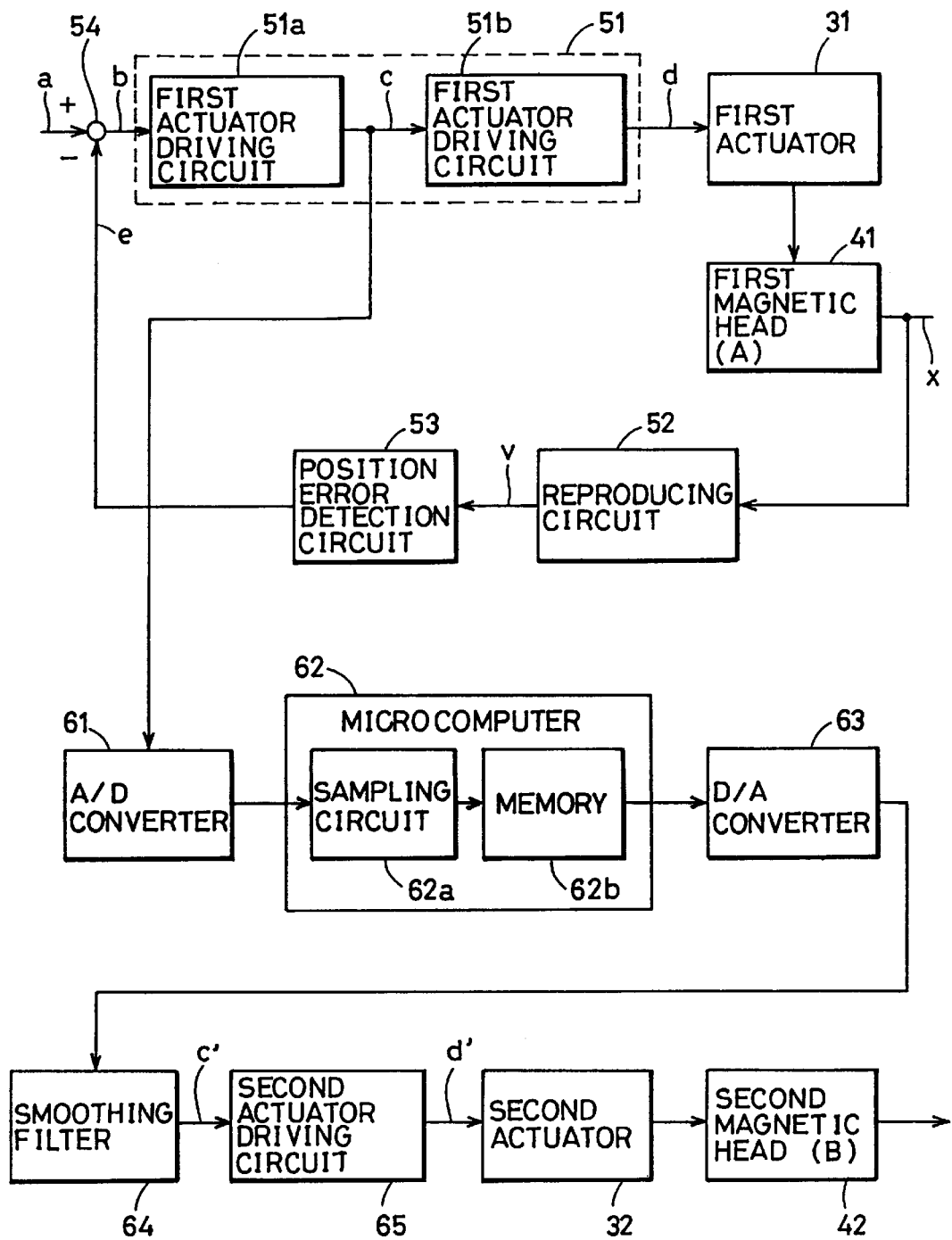
FIG. 9 is a schematic block diagram showing a dynamic tracking system according to the first embodiment of the present invention.

FIG. 9 is a block diagram schematically showing a dynamic tracking system according to a first embodiment of the present invention. In the embodiment shown in FIG. 9, first magnetic head 41(A) is incorporated into a closed loop control system of high accuracy in which a position error signal thereof is fedback to an actuator. A second magnetic head 42(B) is incorporated into an open loop control system in which feedback of a position error signal is not carried out.

Referring to FIG. 9, a dynamic tracking system according to the first embodiment of the present invention includes a closed loop control system formed of a magnetic head 41(A), a reproducing circuit 52, a position error detection circuit 53, an adder 54, a first actuator driving circuit 51 and a first actuator 31.

In a reproduction mode, first magnetic head 41(A) picks up a signal recorded on a magnetic tape (not shown). This signal is externally provided as signal x, and also provided to reproducing circuit 52. Reproducing circuit 52 generates a reproduced signal v according to output signal x of first magnetic head 41(A) during reproduction. Position error detection circuit 53 extracts pilot signals from reproduced signal output v of reproducing circuit 52, whereby an error signal e is detected indicating the relative position error amount of first magnetic head 41(A) with respect to the track being traced by first magnetic head 41(A) according to the extracted pilot signals. Error signal e is fedback to one input of adder 54 to be added with a reference driving signal a provided to the other input. The result is provided as control signal b to first actuator driving circuit 51.

First actuator driving circuit 51 is formed mainly of amplifiers (not shown) provided for loop gain adjustment or the like, and various types of filters provided for servo characteristics compensation or the like. Each constant is set so that this closed loop control system is stable. First actuator driving circuit 51 is divided into two portions of 51a and 51b by a reason set forth afterwards. A control signal c is extracted from the connection point (node) of the two portions 51a and 51b. First actuator driving circuit 51 generates a driving signal d according to control signal b. Driving signal d is provided to first actuator 31. In response, first actuator 31 carries out dynamic tracking for displacing first magnetic head 41(A) in the direction of the track width so that the deviation of position of first magnetic head 41(A) from the currently traced track approaches 0.

The dynamic tracking system according to the first embodiment shown in FIG. 9 further includes an open loop control system formed of an A/D converter 61, a microcomputer 62, a D/A converter 63, a smoothing filter 64, a second actuator driving circuit 65, a second actuator 32 and a second magnetic head 42(B).

In the reproduction mode, control signal c extracted from the node between two portions 51a and 51b of first actuator driving circuit 51 forming the above-described closed loop control system is converted into digital data by A/D converter 61 forming the open loop control system. The converted digital data is provided to microcomputer 62. Microcomputer 62 includes a sampling circuit 62a and a buffer memory 62b. Sampling circuit 62a samples control signal c at a constant frequency, and stores the result into memory 62b as sampling data of one field scanning time period for first magnetic head 41(A).

At the time of switching from the trace of first magnetic head 41(A) to the trace of second magnetic head 42(B), the sampling data of one field scanning time period for the above-described first magnetic head 41(A) begins to be read out in a first-in-first-out manner from memory 62b, whereby sampling data according to each time point is sequentially read out during one field scanning time period for the second magnetic head 42(B). The read out sampling data is converted into analog data by D/A converter 63, and then smoothed by smoothing filter 64. The smoothed data is provided to second actuator driving circuit 65 as control signal c'. Control signal c' has a waveform substantially identical to that of control signal c output from the above-described closed loop control system.

Although this signal c to be sampled may be extracted from any point immediately after the output of adder 54 to which error signal e is fed back to one input terminal thereof up to the input of first actuator 31, a point is desirable where the frequency characteristics of signal c are substantially flat with respect to the frequency component of the error signal in the control band. Such a point for extracting signal c is shown as the node between portions 51a and 51b.

According to control signal c' provided from smoothing filter 64, second actuator driving circuit 65 generates and provides to second actuator 32 a driving signal d'. In response, second actuator 32 carries out dynamic tracking for displacing second magnetic head 42(B) in the track width direction. In order to have second magnetic head 42(B) directly reproduce the trace locus of first magnetic head 41(A) according to the above-described principle of the present invention, the waveform of driving signal d' of the open loop control system is to be substantially equal to that of driving signal d in the closed loop control system when the waveform of control signal c is substantially equal to that of control signal c' which is sampled data thereof. Therefore, second actuator driving circuit 65 of the open loop control system is formed to have a circuit configuration similar to that of portion 51b of first actuator driving circuit 51 of the closed loop control system.

Figure 10:
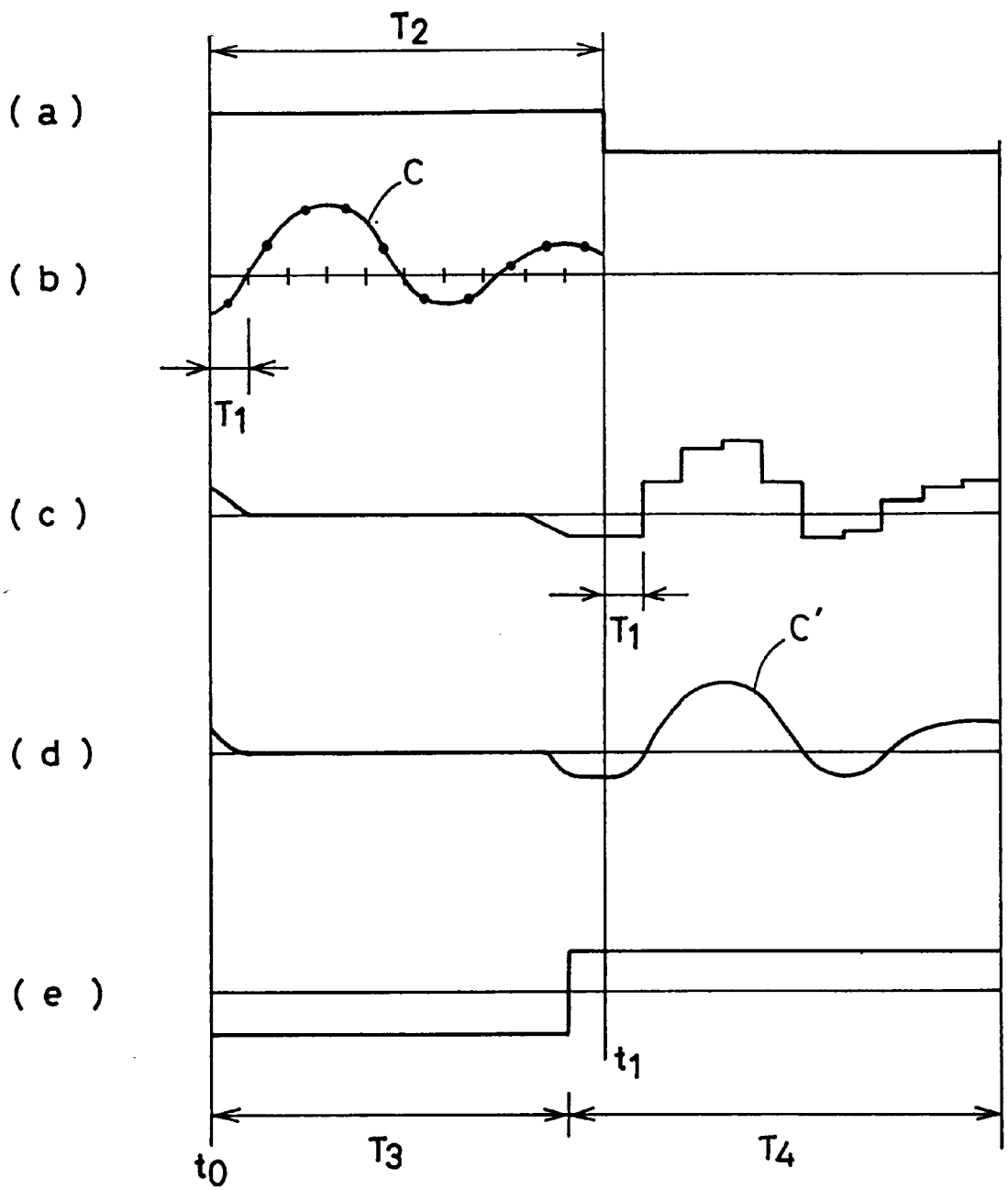
FIG. 10 is a waveform diagram for describing the operation of the first embodiment of FIG. 9.

The process of obtaining control signal c' for second actuator driving circuit 65 by sampling control signal c in the embodiment of FIG. 9 will be described hereinafter with reference to the waveform diagram of FIG. 10. When a switching signal shown in FIG. 10(a) rises to a H level (logical high) at time $t_0$, detection is made that the reproduction head is switched from second magnetic head 42(B) to first magnetic head 41(A). In response, an error signal e corresponding to the position error amount of first magnetic head 41(A) begins to be fedback to adder 54, whereby dynamic tracking of first magnetic head 41(A) by the closed loop control system is initiated. Simultaneously, as shown in (b) in FIG. 10, sampling of signal c which is extracted from first actuator driving circuit 51 and converted into a digital signal by A/D converter 61 is initiated by sampling circuit 62a in microcomputer 62.

A sampling point is set substantially at the center (solid dots in FIG. 10(b)) of each of a plurality of sampling time periods $T_1$ obtained by equally dividing one field scanning time period $T_2$. A digital signal c for each sampling time period $T_1$ is sequentially fetched by sampling circuit 62a to be sequentially stored into buffer memory 62b. As a result, a data train of control signal for second magnetic head 42(B) during the next field scanning time period is formed.

When the head switching signal of FIG. 10(a) falls to a L level (logical low) at time $t_1$, or when it is detected that a head scanning time period $T_2$ elapses from the scanning starting point of first magnetic head 41(A), dynamic tracking of second magnetic head 42(B) by the open loop control system is initiated. More specifically, the above-described control signal data train is sequentially output from buffer memory 62b for every sampling time period $T_1$. Although the output digital control signal data train is converted into analog signal by D/A converter 63, such analog signal still has a waveform of a staircase configuration including quantization error as shown in FIG. 10(c). Smoothing filter 64 is provided to approximate this waveform to that of the former signal c prior to sampling. The signal of FIG. 10(c) is smoothed by smoothing filter 64 to result in an analog control signal c' having a smooth waveform as shown in FIG. 10(d). As described before, control signal c' has a waveform substantially equal to that of control signal c extracted from the closed loop control system.

Control signal c is generated on the basis of error signal e corresponding to the amount of position error of first magnetic head 41(A). Actuator driving circuit 51b of a succeeding stage generates a driving signal d according to this control signal c to drive first actuator 31, whereby dynamic tracking of first magnetic head 41(A) is carried out. Because this dynamic tracking is carried out under closed loop control with a feedback of a position error signal, dynamic tracking of first magnetic head 41(A) is that of high accuracy.

Control signal c' having a waveform substantially equal to that of control signal c is applied to second actuator driving circuit 65 in the open loop control system. In response, second actuator driving circuit 65 generates a driving signal d' which is provided to second actuator 32, whereby dynamic tracking is carried out of second magnetic head 42(B). Therefore, tracking of second magnetic head 42(B) is also that of high accuracy regardless of being carried out under open loop control. In other words, tracing by second magnetic head 42(B) is carried out in an extremely favorable manner with respect to an adjacent track having a track bent substantially equal to that of the track which was traced accurately under the closed loop control by first magnetic head 41(A).

The analog signal of FIG. 10(c) having a staircase waveform right after D/A conversion has ramp signals respectively added immediately preceding and succeeding the scanning time period of second magnetic head 42(B). This is to achieve the effect of suppressing the resonance of the actuator due to the stepped response. This provides the advantage of preventing delay in the activation of the actuator by virtue of a control signal at the scanning starting point being output in advance prior to the scanning starting point $t_1$ of second magnetic head 42(B).

Because first magnetic head 41(A) is controlled under closed loop as described above, control signal c for first magnetic head 41(A) is formed so as to cancel the hysteresis component of first actuator 31. By setting the waveform of control signal c' for second magnetic head 42(B) substantially equal to that of control signal c, highly accurate positioning of second magnetic head 42(B) can also be carried out even by the open loop control without correcting the hysteresis component of second actuator 32. From this point of view, second magnetic head 42(B) can also trace a scanning locus substantially equal to that of first magnetic head 41(A).

The sampling frequency fs when sampling control signal c is set sufficiently higher than the resonance frequency of the actuator. This provides the advantage of suppressing the resonance component of an actuator at a low level in carrying out open loop control.

A great difference in the level of height between first and second magnetic heads 41(A) and 42(B) in the above-described first embodiment may become a disadvantage in carrying out highly accurate tracking due to positioning deviation in an offset manner for the open loop controlled second magnetic head 42(B). In such a case, a signal of a rectangular waveform as shown in FIG. 10(e) is added to control signal c' of second magnetic head 42(B) to solve the problem of such offset-like position error.

More specifically, depolarization of an actuator can be prevented to suppress degradation of the actuator by setting the signal to be added at time period $T_3$ within the scanning time period $T_2$ of first magnetic head 41(A) to a signal that takes a value calculated to set the average value of control signal applied to the actuator substantially to 0. The signal added during time period $T_4$ is set to a signal that takes a value calculated to generate in actuator 32 of second magnetic head 42(B) a displacement for removing the difference in height between the magnetic heads. The addition of a rectangular waveform shown in FIG. 10(e) to control signal c' can be carried out by a calculation process by microcomputer 62 in generating a control signal data train for second magnetic head 42(B).

By applying a rectangular waveform signal as shown in FIG. 10(e) to the actuator of second magnetic head 42(b) to cancel the difference between the heads, a signal can be recorded without superimposing recording tracks with each other even when a movable head is used.

Figure 11:
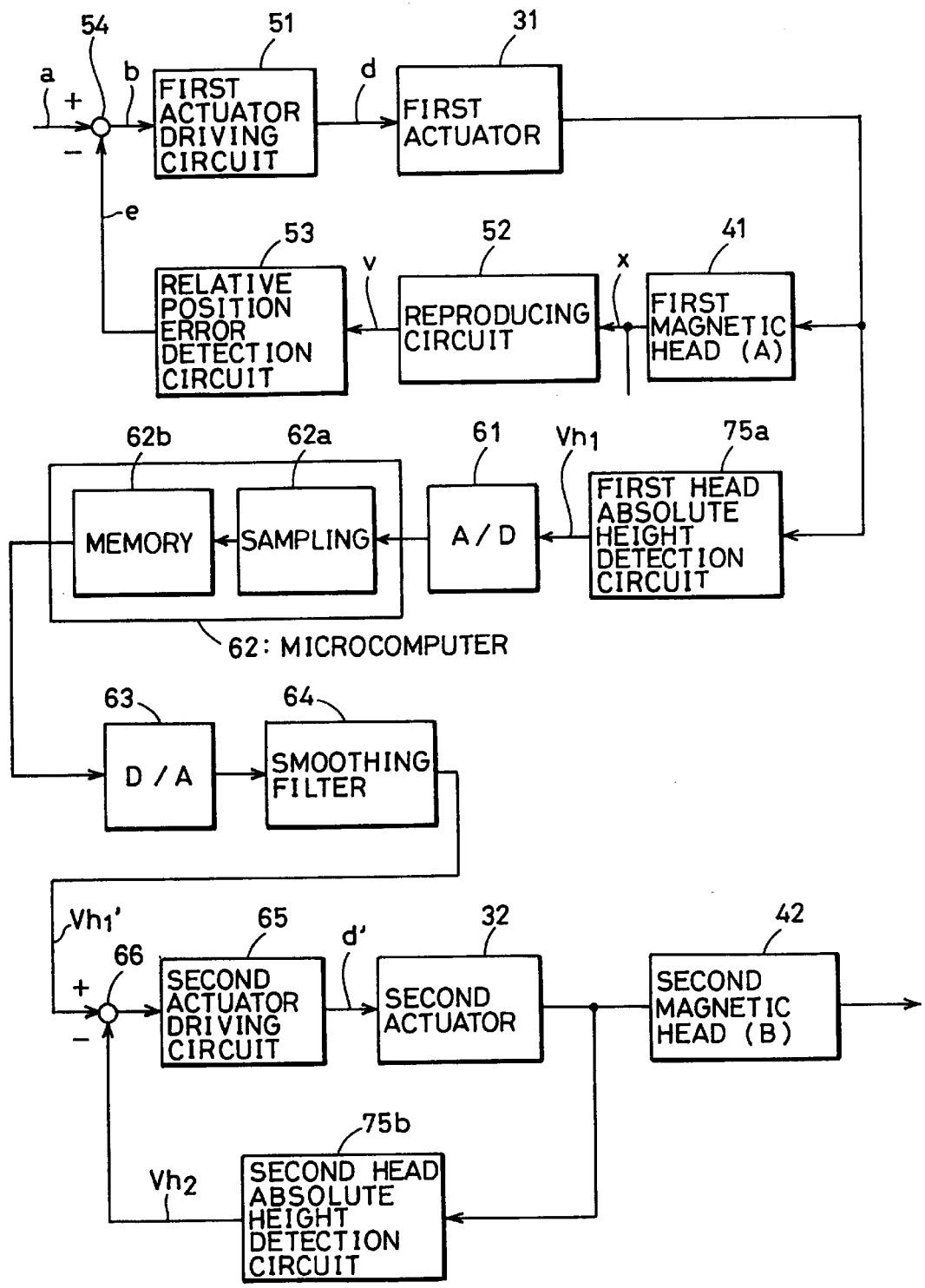
FIG. 11 is a schematic block diagram showing a dynamic tracking system according to a second embodiment of the present invention.

FIG. 11 is a block diagram schematically showing a structure of a dynamic tracking system according to a second embodiment of the present invention. In this embodiment of FIG. 11, first magnetic head 41(A) is incorporated into a highly accurate closed loop control system in which a position error signal thereof is fedback to the actuator. Second magnetic head 42(B) is incorporated into a semi-closed loop control system in which the absolute height of first magnetic head 41(A) is used as the target value instead of a feedback of a position error signal.

Referring to FIG. 11, the dynamic tracking system according to the second embodiment of the present invention includes a closed loop control system formed of a first magnetic head 41(A), a reproducing circuit 52, a relative position error detection circuit 53, an adder 54, a first actuator driving circuit 51, and a first actuator 31. The operation of this closed loop control system is basically similar to that of the first embodiment shown in FIG. 9, and their description will not be repeated.

The dynamic tracking system according to the second embodiment of FIG. 11 further includes a first head absolute height detection circuit 75a, an A/D converter 61, a microcomputer 62, a D/A converter 63, a smoothing filter 64, an adder 66, a second actuator driving circuit 65, a second actuator 32, a second magnetic head 42(B), and a second head absolute height detection circuit 75b. Particularly, second actuator driving circuit 65, second actuator 32, second head absolute height detection circuit 75b and adder 66 form a semi-closed loop control system.

Figure 13A:
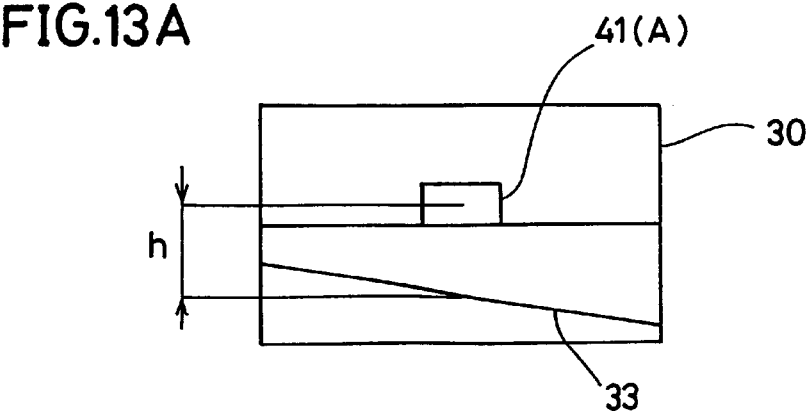
FIGS. 13A and 13B are diagrams schematically showing the principle of the second embodiment of the present invention.
Figure 13B:
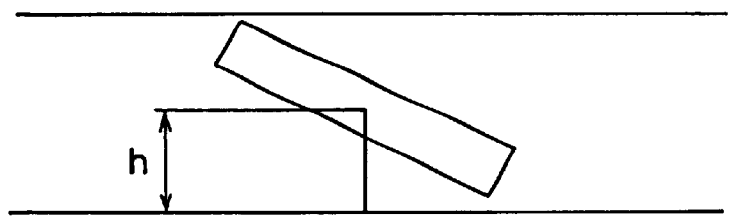
Figure 14:
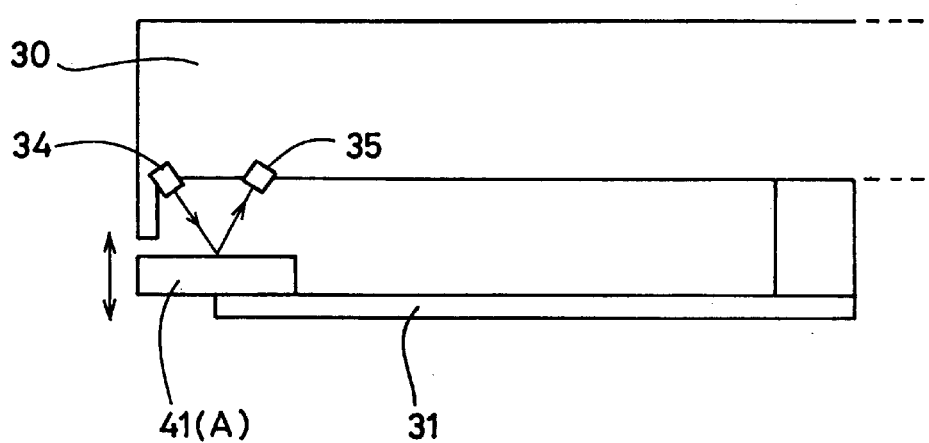
FIG. 14 is a diagram schematically showing a method of measuring the absolute height of a magnetic head according to the second embodiment of the present invention.

At the time of reproduction, a signal $V_{h1}$ representing the absolute height of first magnetic head 41(A) detected by first head absolute height detection circuit 75a is converted into digital data by A/D converter 61 to be provided to microcomputer 62. Here, the absolute height of a magnetic head is the height h from an arbitrary point on the lead formed on the circumferential face of drum 30 to the magnetic head, as shown in the front view of the drum of FIG. 13A. This height h is shown as in FIG. 13B on a track pattern. The value of height h takes a constant value on the basis of a certain point on the lead. Here, this height h is referred to as the absolute height since it is not the difference in height between the two heads, but the height from a reference point on a drum. A detection method of the absolute height of a head by an absolute height detection circuit includes various methods taking advantage of electrostatic amount, eddy current, and optical method. FIG. 14 schematically shows the detection principle of an absolute height detection circuit using an optical method. Referring to FIG. 14, light is emitted towards a head 41 from a laser diode 34 fixed on the main body of a drum 30. The reflected light thereof is received by a light receiving portion 35. As a result, displacement of head 41 is detected, from which the absolute height h of head 41 is detected.

Sampling circuit 62a of microcomputer 62 samples signal $V_{h1}$ at a constant frequency. The sampled result is stored in memory 62b as sampling data of one field scanning time period for first magnetic head 41(A).

At the time of the trace switching from first magnetic head 41(A) to second magnetic head 42(B), sampling data of one field scanning time period for first magnetic head 41(A) begins to be read out in a first-in-first-out manner from memory 62b, whereby sampling data is sequentially read out according to each time point during one field scanning time period for second magnetic head 42(B). The readout sampling data is converted into analog data by D/A converter 63, and then smoothed by smoothing filter 64 to be applied to one input of adder 66 as a reference signal $V_{h1}'$ for the semi-closed loop system. Reference signal $V_{h1}'$ has a waveform substantially equal to that of height signal $V_{h1}$ provided by first absolute height detection circuit 75a from the closed loop system.

Second actuator driving circuit 65 generates a driving signal d' according to an output of adder 66. Driving signal d' is applied to second actuator 32. In response, second actuator 32 carries out dynamic tracking for displacing second magnetic head 42(B) in the direction of the track width. In order to have second magnetic head 42(B) directly reproduce the trace locus of first magnetic head 41(A) according to the aforementioned principle of the present invention, a semi-closed loop control is carried out with reference signal $V_{h1}'$ as the target value when the waveform of height signal $V_{h1}$ is substantially equal to that of reference signal $V_{h1}'$ which is sampling data thereof. A second absolute height detection circuit 75b detecting the absolute height of second magnetic head 42(B) is provided for this purpose, from which a height signal $V_{h2}$ of second magnetic head 42(B) is fedback to the other input of adder 66.

Figure 12:
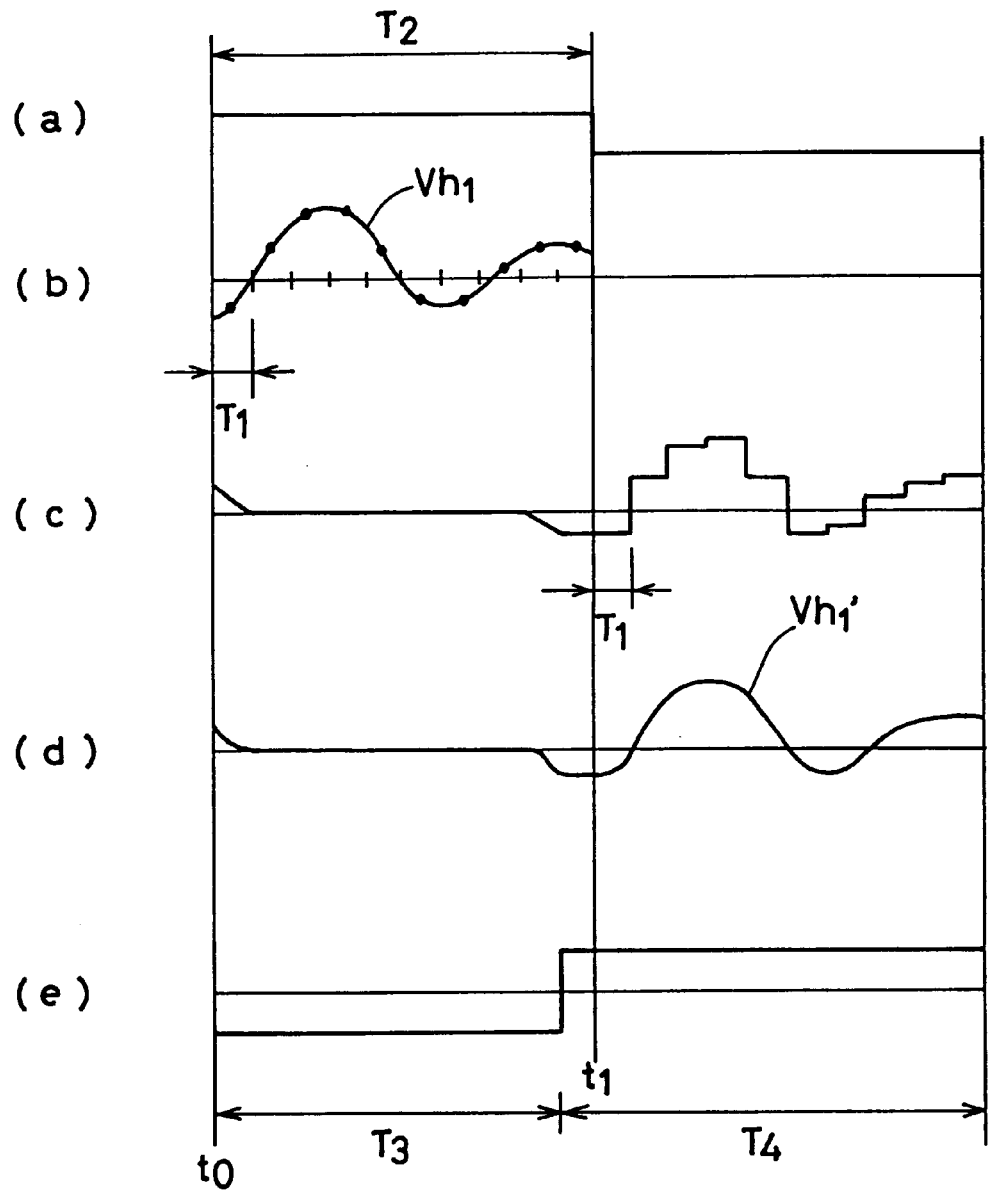
FIG. 12 is a waveform diagram for describing the operation of the second embodiment of FIG. 11.

The process of obtaining a reference signal $V_{h1}'$ of the semi-closed loop control system by sampling a height signal $V_{h1}$ in the embodiment of FIG. 11 will be described hereinafter with reference to the waveform diagram of FIG. 12. When the head switching signal shown in FIG. 12(a) rises to a H level at time $t_0$, detection is made that the reproduction head is switched from second magnetic head 42(B) to first magnetic head 41(A). In response, an error signal e corresponding to the position error amount of first magnetic head 41(A) begins to be fedback to adder 54, whereby dynamic tracking of first magnetic head 41(A) by the closed loop control system is initiated. At the same time, sampling of height signal $V_{h1}$ which is digital-converted by A/D converter 61 is initiated by sampling circuit 62a in microcomputer 62 as shown in FIG. 12(b).

A sampling point is set substantially at the center (solid dots in FIG. 12(b)) of each of a plurality of sampling time periods $T_1$ obtained by equally dividing one field scanning time period $T_2$. A digital signal $V_{h1}$ for each sampling time $T_1$ is sequentially fetched by sampling circuit 62a to be sequentially stored into buffer memory 62b. As a result, a data train of control signal for second magnetic head 42(B) is formed.

When the head switching signal of FIG. 12(a) falls to an L level at time $t_1$, or when it is detected that a head scanning time period $T_2$ elapses from the scanning starting time point of first magnetic head 41(A), dynamic tracking of second magnetic head 42(B) by the semi-open loop control system is initiated. More specifically, the above-described control signal data train is sequentially output from buffer memory 62b for every sampling time period $T_1$. Although the output digital control signal data train is converted into an analog signal by the D/A converter 63, such analog signal still has a waveform of staircase configuration including quantization error as shown in FIG. 12(c). Smoothing filter 64 is provided to approximate the waveform to that of the former signal $V_{h1}$. The signal of FIG. 12(c) is smoothed by smoothing filter 64 to result in an analog reference signal $V_{h1}'$ having a smooth waveform as shown in FIG. 12(d). As described before, reference signal $V_{h1}'$ has a waveform substantially equal to that of height signal $V_{h1}$ of first magnetic head 41(A) extracted from the closed loop control signal.

Because tracking of first magnetic head 41(A) is carried out under closed loop control in which an error signal e obtained from the actually reproduced pilot signal components is fedback, information of track deviation is directly incorporated in tracking, so that tracking can be carried out at high accuracy.

Tracking of second magnetic head 42(B) is carried out under a semi-closed loop control where a height signal $V_{h2}$ of second magnetic head 42(B) is fedback so as to take a locus similar to that of first magnetic head 41, using as reference signal $V_{h1}'$ a signal obtained by sampling head height signal $V_{h1}$ of first magnetic head 41(A). Therefore, tracking of second magnetic head 42(B) is that of high accuracy even if the actual track deviation information of the currently scanned track is not obtained. In other words, tracing by second magnetic head 42(B) is carried out favorably for an adjacent track having a track bent substantially equal to that of the track which was traced by first magnetic head 41(A).

Similar to the first embodiment shown in FIG. 10(c), ramp signals are added to the analog signal having a stepwise waveform right after D/A conversion shown in FIG. 12(c) immediately preceding and succeeding the scanning time period of second magnetic head 42(B).

In order to solve the offset position deviation with respect to second magnetic head 42(B) due to a great difference in the level of height between first and second magnetic heads 41(A) and 42(B), a signal of a rectangular waveform is added to reference signal $V_{h1}'$ of second magnetic head 42(B) as shown in FIG. 12(e), similar to the first embodiment shown in FIG. 10(e).

Although the first and second embodiments have the closed loop control system formed by an analog circuit, a portion thereof may be formed by a digital system using a microcomputer. When a control signal provided from the closed loop control system is already digitized (made in the numeric form), A/D converter 61 and sampling means 62a of microcomputer 62 can be omitted, and the value of the digitized control signal may be directly used as the value of the control signal of the open loop control system or the semi-closed loop control system.

Although a two head configuration where two magnetic heads are disposed facing each other by 180° are used in the above-described first and second embodiments, similar tracking can be carried out by using more than 2 magnetic heads. More specifically, when a reproduction head is to scan a track in which a pilot signal is not recorded, pilot signals reproduced from both the left and right adjacent tracks are detected as crosstalk signals, whereby positioning of the reproduction head is carried out by calculating the position error information according to the detected crosstalk signals under control of the closed loop. In scanning a track right after having a pilot signal recorded, control signal c of the closed loop control system or height signal $V_{h1}$ of the first magnetic head is sampled and stored, whereby open loop control or semi-closed loop control by a control signal c' or a reference signal $V_{h1}'$ formed thereupon is carried out. By carrying out alternately closed loop control and open loop control or semi-closed loop control with respect to the three or more reproduction heads, highly accurate tracking can be realized similar to that of a two-head configuration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotary head type magnetic recording/reproduction apparatus having a function of reproducing a main signal from a plurality of tracks having a plurality of pilot signals of different frequencies recorded to be superimposed sequentially on the main signal for every other track, said rotary head type magnetic recording/reproduction apparatus comprising:

a rotary drum;

a plurality of actuators attached on a circumferential face of said rotary drum with a constant distance therebetween, each of said plurality of actuators being displaceable in a track width direction;

a plurality of magnetic heads attached to said plurality of actuators in a one-to-one correspondence;

means for detecting a relative position error signal of one magnetic head out of said plurality of magnetic heads with respect to one track out of said plurality of tracks according to said pilot signal components included in a signal reproduced from said one track by said one magnetic head;

first control means for generating a control signal indicating an amount of displacement of one actuator corresponding to said one magnetic head out of said plurality of actuators, and for driving said one actuator so that the value of said relative position error signal approaches zero by closed loop control according to said detected relative position error signal;

storage means for temporarily storing the control signal; and driving control means for driving another actuator out of said plurality of actuators according to said stored control signal, for tracking another head, operatively associated with said another actuator, along a track.

2. The rotary head type magnetic recording/reproducing apparatus of claim 1, wherein said first control means further comprises:

means for producing a first actuator driving signal based on the control signal, the first actuator driving signal driving said one actuator corresponding to said one magnetic head so that the value of said relative position error signal approaches zero.

3. The rotary head type magnetic recording/reproducing apparatus of claim 1, wherein said driving control means further comprises:

retrieval means for retrieving the stored control signal from said storage means;

means for generating a second actuator driving signal based on the retrieved control signal, the second actuator driving signal driving said another actuator.

4. The rotary head type magnetic recording/reproducing apparatus of claim 3, further comprising:

smoothing means for smoothing the retrieved control signal and for providing the smoothed control signal to said generating means.

5. The rotary head type magnetic recording/reproducing apparatus of claim 3, wherein said second actuator driving signal is generated by open loop control according to the control signal.

6. The rotary head type magnetic recording/reproducing apparatus of claim 3, wherein said second actuator driving signal is generated by semi-closed loop control according to the control signal.

7. The rotary head type magnetic recording/reproducing apparatus of claim 1, further comprising:

conversion and sampling means for converting the control signal into digital format and for sampling the digitized control signal; and wherein the sampled digitized control signal is temporarily stored in said storage means.

8. A rotary head type magnetic recording/reproduction apparatus having a function of reproducing a main signal from a plurality of tracks having a plurality of pilot signals of different frequencies recorded to be superimposed sequentially on the main signal for every other track, said rotary head type magnetic recording/reproduction apparatus comprising:

a rotary drum;

a plurality of actuators attached on a circumferential face of said rotary drum with a constant distance therebetween, each of said plurality of actuators being displaceable in a track width direction;

a plurality of magnetic heads attached to said plurality of actuators in a one-to-one correspondence;

means for detecting a relative position error signal of one magnetic head out of said plurality of magnetic heads with respect to one track out of said plurality of tracks according to said pilot signal components included in a signal reproduced from said one track by said one magnetic head;

control signal generating means for generating a control signal indicating an amount of displacement of one actuator corresponding to said one magnetic head out of said plurality of actuators, and for driving said one actuator so that the value of said relative position error signal approaches zero by closed loop control according to said detected relative position error signal;

storage means for temporarily storing the control signal; and driving means for driving another actuator out of said plurality of actuators by open loop control according to said stored control signal.

9. The rotary head type magnetic recording/reproduction apparatus according to claim 8, wherein said control signal is extracted from an arbitrary node in said control signal generation means.

10. The rotary head type magnetic recording/reproduction apparatus according to claim 8, further comprising:

analog-digital conversion means for converting said control signal into a digital information signal for temporary storage in said storage means; and digital-analog conversion means for converting said control signal read out from said storage means into an analog signal;

wherein said storage means is in a microcomputer, and generation and storage of said digital information signal are carried out digitally.

11. The rotary head type magnetic recording/reproduction apparatus according to claim 8, further comprising:

sampling means for sequentially sampling said control signal at a constant sampling frequency for temporary storage in said storage means as concerning information.

12. The rotary head type magnetic recording/reproduction apparatus according to claim 11, further comprising means for smoothing said concerning information read out from said storage means.

13. The rotary head type magnetic recording/reproduction apparatus according to claim 11, wherein said concerning information is obtained by sampling said control signal for one field scanning time period for said one actuator by said sampling means and is sequentially stored into said storage means, and information according to each time point is sequentially read out during one field scanning time period of said another actuator for use by said driving means.

14. The rotary head type magnetic recording/reproduction apparatus according to claim 13, wherein said read out concerning information includes ramp signals added immediately preceding and succeeding one field scanning time period for said another actuator.

15. The rotary head type magnetic recording/reproduction apparatus according to claim 11, wherein the sampling frequency in sampling said control signal is set higher than the resonance frequency of said actuator.

16. The rotary head type magnetic recording/reproduction apparatus according to claim 8, further comprising means for superimposing an offset compensation signal on said control signal.

17. The rotary head type magnetic recording/reproducing apparatus of claim 8, further comprising:

sampling and converting means for sequentially sampling the control signal at a constant sampling frequency and digitally converting the sampled control signal; and wherein the sampled control signal is temporary stored in said storage means.

18. The rotary head type magnetic recording/reproduction apparatus of claim 8, wherein said driving means drives said another actuator according to solely said stored control signal, in order to track another magnetic head out of said plurality of magnetic heads along another track out of said plurality of tracks, said another head being operatively associated with said another actuator.

19. A rotary head type magnetic recording/reproduction apparatus having a function of reproducing a main signal from a plurality of tracks having a plurality of pilot signals of different frequencies recorded to be superimposed sequentially on the main signal for every other track, said rotary head type magnetic recording/reproduction apparatus comprising:

a rotary drum;

a plurality of actuators attached on a circumferential face of said rotary drum with a constant distance therebetween, each of said plurality of actuators being displaceable in a track width direction;

a plurality of magnetic heads attached to said plurality of actuators in a one-to-one correspondence;

means for detecting a relative position error signal of one magnetic head out of said plurality of magnetic heads with respect to one track out of said plurality of tracks according to said pilot signal components included in a signal reproduced from said one track by said one magnetic head;

means for generating a control signal for driving one actuator corresponding to said one magnetic head out of said plurality of actuators so that the value of said relative position error signal approaches zero by closed loop control according to said detected relative position error signal;

absolute height detection means for detecting absolute height of said magnetic head attached to said one actuator detected by said absolute height detection means; and means for temporarily storing first information concerning the absolute height of said magnetic head attached to said one actuator detected by said absolute height detection means; and means for driving another actuator out of said plurality of actuators by semi-closed loop control according to said stored first information.

20. The rotary head type magnetic recording/reproduction apparatus according to claim 19, further comprising information generating means for generating and providing to said storing means said first information according to the absolute height of said magnetic head detected by said absolute height detection means.

21. The rotary head type magnetic recording/reproduction apparatus according to claim 20, further comprising:

analog-digital conversion means for converting the absolute height of said magnetic head detected by said absolute height detection means into a digital signal; and digital-analog conversion means for converting said first information read out from said storing means into an analog signal;

wherein said information generating means and said storing means are formed of a microcomputer, and generation and storage of said first information are carried out digitally.

22. The rotary head type magnetic recording/reproduction apparatus according to claim 21, wherein said information generating means generates said first information by sequentially sampling the detected absolute height of said magnetic head at a constant sampling frequency.

23. The rotary head type magnetic recording/reproduction apparatus according to claim 22, further comprising means for smoothing said first information read out from said storing means.

24. The rotary head type magnetic recording/reproduction apparatus according to claim 23, wherein said first information is obtained by sampling the detected absolute height of said magnetic head for one field scanning time period for said one actuator by said information generating means and is sequentially stored into said storing means, and information according to each time point is sequentially read out to be applied to said smoothing means during one field scanning time period for said another actuator.

25. The rotary head type magnetic recording/reproduction apparatus according to claim 24, wherein said concerning information generated by said information generating means includes ramp signals added immediately preceding and succeeding one field scanning time period for said another actuator.

26. The rotary head type magnetic recording/reproduction apparatus according to claim 19, further comprising means for superimposing an offset compensation signal on said first information.

27. A method for controlling the tracking of a plurality of heads in a recording/reproduction apparatus, comprising the steps of:

(a) providing relative movement between a first head and a first data track;

(b) detecting a relative position error signal of the first head with respect to the first data track;

(c) generating a control signal for altering the position of the first head so that the value of the relative position error signal approaches zero;

(d) temporarily storing the control signal for later use in controlling a position of a second head;

(e) controlling the position of the second head in accordance with the stored control signal.

28. The method of claim 27, wherein said step (e) operates by open loop control.

29. The method of claim 27, wherein said step (e) operates by semi-closed loop control.

30. A method for controlling the tracking of a plurality of heads during data reproduction from a recording medium, the heads alternately tracking tracks on the recording medium during respective scanning time periods, the method comprising the steps of:

(a) detecting a relative position error signal of a first head with respect to a data track during a first scanning time period;

(b) generating a control signal for driving an actuator of the first head so that the value of the relative position error signal approaches zero;

(c) storing the control signal;

(d) controlling an actuator of a second head during a second scanning time period according to the stored control signal; and (e) repeating steps (a) through (d) during data reproduction from the recording medium.

31. The method of claim 30, wherein said step (a) includes the tracking of the first head along a first data track, and said step (d) controls the actuator of the second head so that the second head tracks along a second data track; and wherein the first data track is adjacent the second data track on the recording medium.

32. The method of claim 30, wherein the second scanning time period immediately follows the first scanning time period.

33. The method of claim 30, wherein said step (d) operates by open loop control.

34. The method of claim 30, wherein said step (d) operates by semi-closed loop control.

35. A method for controlling the tracking of a plurality of heads over a recording medium in a recording/reproduction apparatus, comprising the steps of:

(a) providing first and second heads on respective independently controlled actuators;

(b) providing relative movement between a first head and a first data track;

(c) detecting a relative position error signal of the first head with respect to the first data track;

(d) generating a control signal for driving the actuator of the first head so that the value of the relative position error signal approaches zero;

(e) temporarily storing the control signal;

(f) retrieving the temporarily stored control signal;

(g) driving the actuator of the second head according to the retrieved control signal; and (h) repeating steps (b) through (g).

36. The method of claim 35, where said steps (a) through (h) are executed during a data reproduction operation on a single recording medium.

37. The method of claim 35, further including the steps of:

(i) converting the control signal, prior to said step (e), into a digitized format; and (j) sampling the digitized control signal at a constant frequency;

wherein the sampled control signal is temporarily stored in said step (e).

38. The method of claim 35, wherein said step (g) is based on open loop control.

39. The method of claim 35, wherein said step (g) is based on semi-closed loop control.

40. A method for controlling the tracking of a plurality of heads in a recording/reproduction apparatus, the heads alternately tracking during respective scanning time periods, comprising the steps of:

(a) detecting a relative position error signal of a first head with respect to a data track during a first scanning time period;

(b) generating a control signal for driving an actuator of the first head so that the value of the relative position error signal approaches zero;

(c) temporarily storing the control signal for use during a second scanning time period;

(d) controlling an actuator of a second head during the second scanning time period according to the stored control signal; and (e) repeating steps (a) through (d).

41. The method for controlling the tracking of a plurality of heads in a recording/reproduction apparatus according to claim 40, wherein said step (d) controls the actuator of the second head by open loop control.

42. The method for controlling the tracking of a plurality of heads in a recording/reproduction apparatus according to claim 40, wherein said step (d) controls the actuator of the second head by semi-closed loop control.

43. A data recording/reproducing apparatus for reproducing data from a recording medium having a plurality of tracks, comprising:

a plurality of independently controlled actuators;

a plurality of data heads, each data head respectively connected to one of said plurality of independently controlled actuators;

detecting means for detecting a relative position error signal of one data head with respect to one of the tracks;

means for producing an information signal representing an amount of displacement of said one data head relative to the one track;

means for temporarily storing the information signal for later use in controlling an actuator of a second data head;

first drive signal producing means for producing a first actuator drive signal in accordance with the information signal, the drive signal driving an actuator connected to the first data head in a track width direction so that the value of the relative position error signal approaches zero;

second drive signal producing means for retrieving the stored information signal and for generating a second actuator drive signal in accordance with the retrieved information signal, the second actuator drive signal driving a second actuator connected to the second data head in a track width direction.

44. The apparatus of claim 43, wherein the first actuator drive signal is produced during a first scanning time period; and wherein the second actuator drive signal is generated during a second scanning time period, the first and second scanning time periods immediately following each other.

45. The apparatus of claim 43, wherein said first drive signal producing means produces the first actuator drive signal in accordance with the information signal based on closed loop control.

46. The apparatus of claim 43, wherein said second drive signal producing means produces the second actuator drive signal in accordance with the retrieved information signal based on open loop control.

47. The apparatus of claim 43, wherein said second drive signal producing means produces the second actuator drive signal in accordance with the retrieved information signal based on semi-closed loop control.

* * * * *